United States Patent [19]

Swan et al.

[11] Patent Number: 5,227,088
[45] Date of Patent: Jul. 13, 1993

[54] AZEOTROPE-LIKE COMPOSITIONS OF 1-CHLORO-3,3,3-TRIFLUOROPROPANE AND A $C_5$ OR $C_6$ HYDROCARBON

[75] Inventors: Ellen L. Swan, Ransomville; Richard M. Hollister, Buffalo; Rajat S. Basu, Williamsville, all of N.Y.

[73] Assignee: Allied-Signal Inc., Morris Township, Morris County, N.J.

[21] Appl. No.: 798,337

[22] Filed: Nov. 26, 1991

[51] Int. Cl.$^5$ .................. C11D 7/30; C08J 9/14; C09K 3/30; C23G 5/028
[52] U.S. Cl. .................................... 252/172; 134/12; 134/31; 134/38; 134/40; 134/42; 252/153; 252/162; 252/305; 252/364; 252/DIG. 9; 264/53; 264/DIG. 5; 521/98; 521/131
[58] Field of Search ............ 252/67, 162, 170, 171, 252/172, 305, 364, 153, DIG. 9; 134/12, 31, 38, 40, 42; 264/53, DIG. 5; 521/98, 131

[56] References Cited

U.S. PATENT DOCUMENTS

| | | | |
|---|---|---|---|
| 3,725,317 | 4/1973 | Ronden et al. | 260/2.5 E |
| 4,795,763 | 1/1989 | Gluck et al. | 521/99 |
| 5,034,149 | 3/1990 | Merchant | 252/171 |
| 5,066,418 | 11/1991 | Merchant | 252/172 |
| 5,152,845 | 10/1992 | Li | 134/40 |
| 5,158,617 | 10/1992 | Li | 134/40 |

FOREIGN PATENT DOCUMENTS

| | | | |
|---|---|---|---|
| 1-304195 | 12/1989 | Japan | 252/172 |
| 2-164404 | 6/1990 | Japan. | |
| 2-166185 | 6/1990 | Japan | 252/172 |
| 2-166197 | 6/1990 | Japan | 252/172 |
| 2-166198 | 6/1990 | Japan | 252/172 |
| 2-166199 | 6/1990 | Japan | 252/172 |
| 2-166288 | 6/1990 | Japan | 252/172 |
| 2-204420 | 8/1990 | Japan | 252/172 |
| 2-204466 | 8/1990 | Japan | 252/172 |
| 2-237945 | 9/1990 | Japan | 252/172 |
| 2-237946 | 9/1990 | Japan | 252/172 |
| 642285 | 1/1979 | U.S.S.R. . | |
| 90/08814 | 8/1990 | World Int. Prop. O. . | |

*Primary Examiner*—Linda Skaling
*Attorney, Agent, or Firm*—Colleen D. Szuch; Jay P. Friedenson

[57] ABSTRACT

Azeotrope-like compositions of 1-chloro-3,3,3-trifluoropropane and a hydrocarbon containing five or six carbon atoms have been discovered which are useful in a variety of applications including industrial cleaning, blowing agent and aerosol applications.

27 Claims, No Drawings

AZEOTROPE-LIKE COMPOSITIONS OF 1-CHLORO-3,3,3-TRIFLUOROPROPANE AND A C$_5$ OR C$_6$ HYDROCARBON

FIELD OF THE INVENTION

This invention relates to azeotrope-like mixtures of 1-chloro-3,3,3-trifluoropropane (HCFC-253eb) and a C$_5$ or C$_6$ hydrocarbon. These mixtures are useful in a variety of applications including industrial cleaning, blowing agent and aerosol applications.

BACKGROUND OF THE INVENTION

Fluorocarbon based solvents have been used extensively for the degreasing and otherwise cleaning of solid surfaces, especially intricate parts and difficult to remove soils.

In its simplest form, vapor degreasing or solvent cleaning consists of exposing a room temperature object to be cleaned to the vapors of a boiling solvent. Vapors condensing on the object provide clean distilled solvent to wash away grease or other contamination. Final evaporation of solvent from the object leaves the object free of residue. This is contrasted with liquid solvents which leave deposits on the object after rinsing.

A vapor degreaser is used for difficult to remove soils where elevated temperature is necessary to improve the cleaning action of the solvent, or for large volume assembly line operations where the cleaning of metal parts and assemblies must be done efficiently. The conventional operation of a vapor degreaser consists of immersing the part to be cleaned in a sump of boiling solvent which removes the bulk of the soil, thereafter immersing the part in a sump containing freshly distilled solvent near room temperature, and finally exposing the part to solvent vapors over the boiling sump which condense on the cleaned part. In addition, the part can also be sprayed with distilled solvent before final rinsing.

Vapor degreasers suitable in the above-described operations are well known in the art. For example, Sherliker et al. in U.S. Pat. No. 3,085,918 disclose such suitable vapor degreasers comprising a boiling sump, a clean sump, a water separator, and other ancillary equipment.

Cold cleaning is another application where a number of solvents are used. In most cold cleaning applications, the soiled part is either immersed in the fluid or wiped with cloths soaked in solvents and allowed to air dry.

Recently, nontoxic nonflammable fluorocarbon solvents like trichlorotrifluoroethane, have been used extensively in degreasing applications and other solvent cleaning applications. Trichlorotrifluoroethane has been found to have satisfactory solvent power for greases, oils, waxes and the like. It has therefore found widespread use for cleaning electric motors, compressors, heavy metal parts, delicate precision metal parts, printed circuit boards, gyroscopes, guidance systems, aerospace and missile hardware, aluminum parts, etc.

The art has looked towards azeotropic compositions having fluorocarbon components because the fluorocarbon components contribute additionally desired characteristics, like polar functionality, increased solvency power, and stabilizers. Azeotropic compositions are desired because they do not fractionate upon boiling. This behavior is desirable because in the previously described vapor degreasing equipment with which these solvents are employed, redistilled material is generated for final rinse-cleaning. Thus, the vapor degreasing system acts as a still. Therefore, unless the solvent composition is essentially constant boiling, fractionation will occur and undesirable solvent distribution may act to upset the cleaning and safety of processing. Preferential evaporation of the more volatile components of the solvent mixtures, which would be the case if they were not an azeotrope or azeotrope-like, would result in mixtures with changed compositions which may have less desirable properties, such as lower solvency towards soils, less inertness towards metal, plastic or elastomer components, and increased flammability and toxicity.

Besides being useful in cleaning applications, fluorocarbons have utility in the production of polyurethane and polyisocyanurate foam as foam expansion agents or blowing agents. Traditionally trichlorofluoromethane (CFC-11), dichlorodifluoromethane (CFC-12) and 1,1,2-trichloro-1,2,2-trifluoroethane (CFC-113) have been the blowing agents of choice in the preparation of these foams.

The art is continually seeking new fluorocarbon based azeotropic mixtures or azeotrope-like mixtures which offer alternatives for new and special applications for industrial cleaning, refrigerant, blowing agent and aerosol applications. Currently, fluorocarbon-based azeotrope-like mixtures are of particular interest because they are considered to be stratospherically safe substitutes for presently used fully halogenated chlorofluorocarbons (i.e., e.g., CFC-11, CFC-12, CFC-113). The latter have been implicated in causing environmental problems associated with the depletion of the earth's protective ozone layer. Mathematical models have substantiated that hydrochlorofluorocarbons, like 1-chloro-3,3,3-trifluoropropane, have a much lower ozone depletion potential and global warming potential than the fully halogenated species.

Accordingly, it is an object of the present invention to provide novel environmentally acceptable azeotrope-like compositions which are useful in a variety of applications including industrial cleaning, blowing agent and aerosol applications.

It is another object of this invention to provide azeotrope-like compositions which are liquid at room temperature and which will not fractionate under conditions of use.

Other objects and advantages of the invention will become apparent from the following description.

SUMMARY OF THE INVENTION

The invention relates to novel azeotrope-like compositions which are useful in a variety of applications including industrial cleaning, blowing agent and aerosol applications. Specifically the invention relates to compositions of 1-chloro-3,3,3-trifluoropropane and a C$_5$ or C$_6$ hydrocarbon which are essentially constant boiling, environmentally acceptable and which remain liquid at room temperature.

DETAILED DESCRIPTION OF THE INVENTION

In accordance with the invention, novel azeotrope-like compositions of 1-chloro-3,3,3-trifluoropropane (HCFC-253eb) and a C$_5$ or C$_6$ hydrocarbon have been discovered wherein the azeotrope-like components of the composition consist of 1-chloro-3,3,3-trifluoropropane and a C$_5$ or C$_6$ hydrocarbon.

As used herein, the term "C$_5$ hydrocarbon" shall refer to cyclopentane, a hydrocarbon containing five carbon atoms. The term "C$_6$ hydrocarbon" shall refer to one of the following six carbon hydrocarbons: 2-methylpentane, 3-methylpentane, 2,2-dimethylbutane, 2,3-dimethylbutane, isohexane and n-hexane.

The HCFC-253eb component of the invention has good solvent properties. The hydrocarbon component also has good solvent capabilities; enhancing the solubility of oils. Thus, when these components are combined in effective amounts, an efficient azeotropic solvent results.

When the C$_5$ hydrocarbon, cyclopentane is used, the azeotrope-like compositions of the invention consist essentially of from about 85 to about 52 weight percent HCFC-253eb and from about 15 to about 48 weight percent cyclopentane and boil at about 39.1° C.±0.5° C. at 760 mm Hg.

In a preferred embodiment using cyclopentane, the azeotrope-like compositions of the invention consist essentially of from about 82.5 to about 60 weight percent HCFC-253eb and from about 17.5 to about 40 weight percent cyclopentane.

In a more preferred embodiment using cyclopentane, the azeotrope-like compositions of the invention consist essentially of from about 77.5 to about 62 weight percent HCFC-253eb and from about 22.5 to about 38 weight percent cyclopentane.

When a C$_6$ hydrocarbon is used and the C$_6$ hydrocarbon is 2-methylpentane, the azeotrope-like compositions of the invention consist essentially of from about 95 to about 67 weight percent HCFC-253eb and from about 5 to about 33 weight percent 2-methylpentane and boil at about 43.2° C.±0.5° C. at 760 mm Hg.

In a preferred embodiment using 2-methylpentane, the azeotrope-like compositions of the invention consist essentially of from about 92 to about 70 weight percent HCFC-253eb and from about 8 to about 30 weight percent 2-methylpentane.

In a more preferred embodiment using 2-methylpentane, the azeotrope-like compositions of the invention consist essentially of from about 89 to about 75 weight percent HCFC-253eb and from about 11 to about 25 weight percent 2-methylpentane.

When the C$_6$ hydrocarbon is 3-methylpentane, the azeotrope-like compositions of the invention consist essentially of from about 97 to about 70 weight percent HCFC-253eb and from about 3 to about 30 weight percent 3-methylpentane and boil at about 43.8° C.±0.5° C. at 760 mm Hg.

In a preferred embodiment using 3-methylpentane, the azeotrope-like compositions of the invention consist essentially of from about 95 to about 73 weight percent HCFC-253eb and from about 5 to about 27 weight percent 3-methylpentane.

In a more preferred embodiment using 3-methylpentane, the azeotrope-like compositions of the invention consist essentially of from about 93 to about 73 weight percent HCFC-253eb and from about 7 to about 27 weight percent 3-methylpentane.

When the C$_6$ hydrocarbon is 2,2-dimethylbutane, the azeotrope-like compositions of the invention consist essentially of from about 88 to about 55 weight percent HCFC-253eb and from about 12 to about 45 weight percent 2,2-dimethylbutane and boil at about 40.1° C.±0.8° C. at 760 mm Hg.

In a preferred embodiment using 2,2-dimethylbutane, the azeotrope-like compositions of the invention consist essentially of from about 85 to about 60 weight percent HCFC-253eb and from about 15 to about 40 weight percent 2,2-dimethylbutane.

In a more preferred embodiment using 2,2-dimethylbutane, the azeotrope-like compositions of the invention consist essentially of from about 82 to about 62 weight percent HCFC-253eb and from about 18 to about 38 weight percent 2,2-dimethylbutane.

When the C$_6$ hydrocarbon is 2,3-dimethylbutane, the azeotrope-like compositions of the invention consist essentially of from about 94 to about 65 weight percent HCFC-253eb and from about 6 to about 35 weight percent 2,3-dimethylbutane and boil at about 42.9° C.±0.8° C. at 760 mm Hg.

In a preferred embodiment using 2,3-dimethylbutane, the azeotrope-like compositions of the invention consist essentially of from about 93 to about 67 weight percent HCFC-253eb and from about 7 to about 33 weight percent 2,3-dimethylbutane.

In a more preferred embodiment using 2,3-dimethylbutane, the azeotrope-like compositions of the invention consist essentially of from about 92 to about 67 weight percent HCFC-253eb and from about 8 to about 33 weight percent 2,3-dimethylbutane.

When the C$_6$ hydrocarbon is isohexane, the azeotrope-like compositions of the invention consist essentially of from about 92 to about 55 weight percent HCFC-253eb and from about 8 to about 45 weight percent isohexane and boil at about 42.8° C.±0.5° C. at 760 mm Hg.

In a preferred embodiment using isohexane, the azeotrope-like compositions of the invention consist essentially of from about 91 to about 60 weight percent HCFC-253eb and from about 9 to about 40 weight percent isohexane.

In a more preferred embodiment using isohexane, the azeotrope-like compositions of the invention consist essentially of from about 90 to about 62 weight percent HCFC-253eb and from about 10 to about 38 weight percent isohexane.

When the C$_6$ hydrocarbon is n-hexane, the azeotrope-like compositions of the invention consist essentially of from about 97 to about 85 weight percent HCFC-253eb and from about 3 to about 15 weight percent n-hexane and boil at about 44.0° C.±0.5° C. at 760 mm Hg.

In a preferred embodiment using n-hexane, the azeotrope-like compositions of the invention consist essentially of from about 96 to about 88 weight percent HCFC-253eb and from about 4 to about 12 weight percent n-hexane.

In a more preferred embodiment using n-hexane, the azeotrope-like compositions of the invention consist essentially of from about 95 to about 90 weight percent HCFC-253eb and from about 5 to about 10 weight percent n-hexane.

The precise or true azeotrope compositions have not been determined but have been ascertained to be within the indicated ranges. Regardless of where the true azeotropes lie, all compositions within the indicated ranges, as well as certain compositions outside the indicated ranges, are azeotrope-like, as defined more particularly below.

From fundamental principles, the thermodynamic state of a fluid is defined by four variables: pressure, temperature, liquid composition and vapor composition, or P-T-X-Y, respectively. An azeotrope is a unique characteristic of a system of two or more components where X and Y are equal at a stated P and T. In practice, this means that the components of a mixture cannot be separated during distillation, and therefore are useful in vapor phase solvent cleaning as described above.

For purposes of this discussion, by azeotrope-like composition is intended to mean that the composition behaves like a true azeotrope in terms of its constant-boiling characteristics or tendency not to fractionate upon boiling or evaporation. Such compositions may or may not be a true azeotrope. Thus, in such compositions, the composition of the vapor formed during boiling or evaporation is identical or substantially identical to the original liquid composition. Hence, during boiling or evaporation, the liquid composition, if it changes at all, changes only minimally. This is contrasted with non-azeotrope-like compositions in which the liquid composition changes substantially during boiling or evaporation.

Thus, one way to determine whether a candidate mixture is "azeotrope-like" within the meaning of this invention, is to distill a sample thereof under conditions (i.e. resolution—number of plates) which would be expected to separate the mixture into its separate components. If the mixture is non-azeotropic or non-azeotrope-like, the mixture will fractionate, i.e., separate into its various components with the lowest boiling component distilling off first, and so on. If the mixture is azeotrope-like, some finite amount of a first distillation cut will be obtained which contains all of the mixture components and which is constant boiling or behaves as a single substance. This phenomenon cannot occur if the mixture is not azeotrope-like, i.e., it is not part of an azeotropic system. If the degree of fractionation of the candidate mixture is unduly great, then a composition closer to the true azeotrope must be selected to minimize fractionation. Of course, upon distillation of an azeotrope-like composition such as in a vapor degreaser, the true azeotrope will form and tend to concentrate. Ebulliometric techniques may also be used to determine azeotropy. Using this technique, the proportions of the components in a composition are varied and their boiling points measured and recorded. Using the minimum and maximum boiling points, the azeotrope can be determined. See Example 1.

It follows from the above that another characteristic of azeotrope-like compositions is that there is a range of compositions containing the same components in varying proportions which are azeotrope-like. All such compositions are intended to be covered by the term azeotrope-like as used herein. As an example, it is well known that at different pressures, the composition of a given azeotrope will vary at least slightly as does the boiling point of the composition. Thus, an azeotrope of A and B represents a unique type of relationship but with a variable composition depending on temperature and/or pressure. Accordingly, another way of defining azeotrope-like within the meaning of the invention is to state that mixtures of HCFC-253eb and cyclopentane boil within ±0.5° C. (at 760 mm Hg) of about 39.1° C.; mixtures of HCFC-253eb and 2-methylpentane boil within ±0.5° C. (at 760 mm Hg) of about 43.2° C.; mixtures of HCFC-253eb and 3-methylpentane boil within ±0.5° C. (at 760 mm Hg) of about 43.8° C.; mixtures of HCFC-253eb and 2,2-dimethylbutane boil within ±0.8° C. (at 760 mm Hg) of about 40.1° C.; mixtures of HCFC-253eb and 2,3-dimethylbutane boil within ±0.8° C. (at 760 mm Hg) of about 40.1° C.; mixtures of HCFC-253eb and isohexane boil within ±0.5° C. (at 760 mm Hg) of about 42.8° C.; and mixtures of HCFC-253eb and n-hexane boil within ±0.5° C. (at 760 mm Hg) of about 44.0° C. As is readily understood by persons skilled in the art, the boiling point of the azeotrope will vary with the pressure.

As stated above, the azeotrope-like compositions discussed herein are useful as solvents for various cleaning applications including vapor degreasing, defluxing, cold cleaning, dry cleaning, dewatering, decontamination, spot cleaning, aerosol propelled rework, extraction, particle removal, and surfactant cleaning applications.

Thus, in one process embodiment of the invention, the azeotrope-like compositions of the invention may be used to clean solid surfaces by treating said surfaces with said compositions in any manner well known in the art such as by dipping or spraying or use of conventional degreasing apparatus.

When the present azeotrope-like compositions are used to clean solid surfaces by spraying the surfaces with the compositions, preferably, the azeotrope-like compositions are sprayed onto the surfaces by using a propellant. Preferably, the propellant is selected from the group consisting of hydrocarbons, chlorofluorocarbons, hydrochlorofluorocarbons, hydrofluorocarbons, dimethyl ether, carbon dioxide, nitrogen, nitrous oxide, methylene oxide, air, and mixtures thereof.

Useful hydrocarbon propellants include isobutane, butane, propane, and mixtures thereof; commercially available isobutane, butane, and propane may be used in the present invention. Useful chlorofluorocarbon propellants include trichlorofluoromethane (known in the art as CFC-11), dichlorodifluoromethane (known in the art as CFC-12), 1,1,2-trichloro-1,2,2-trifluoroethane (known in the art as CFC-113), and 1,2-dichloro-1,1,2,2-tetrafluoroethane (known in the art as CFC-114 ; commercially available CFC-11, CFC-12, CFC-113, and CFC-114 may be used in the present invention.

Useful hydrochlorofluorocarbon propellants include dichlorofluoromethane (known in the art as HCFC-21), chlorodifluoromethane (known in the art as HCFC-22), 1-chloro-1,2,2,2-tetrafluoroethane (known in the art as HCFC-124), 1,1-dichloro-2,2-difluoroethane (known in the art as HCFC-132a), 1-chloro-2,2,2-trifluoroethane (known in the art as HCFC-133), and 1-chloro-1,1-difluoroethane (known in the art as HCFC-142b); commercially available HCFC-21, HCFC-22, and HCFC-142b may be used in the present invention. HCFC-124 may be prepared by a known process such as that taught by U.S. Pat. No. 4,843,181 and HCFC-133 may be prepared by a known process such as that taught by U.S. Pat. No. 3,003,003.

Useful hydrofluorocarbon propellants include trifluoromethane (known in the art as HFC-23), 1,1,1,2-tetrafluoroethane (known in the art as HFC-134a), and 1,1-difluoroethane (known in the art as HFC-152a); commercially available HFC-23 and HFC-152a may be used in the present invention. Until HFC-134a becomes available in commercial quantities, HFC-134a may be prepared by any known method such as that disclosed by U.S. Pat. No. 4,851,595. More preferred propellants include hydrochlorofluorocarbons, hydrofluorocarbons, and mixtures thereof. The most preferred propellants include chlorodifluoromethane and 1,1,1,2-tetrafluoroethane.

In another process embodiment, the azeotrope-like compositions of the invention may be used to form polyurethane and polyisocyanurate foams by reacting and foaming a mixture of ingredients which will react to form polyurethane and polyisocyanurate foams in the presence of a blowing agent comprising the azeotrope-like compositions.

The compositions of the invention may be used as auxiliary or primary blowing agents for the preparation of polyurethane foams. Polyurethanes are polymers of polyols and isocyanates. A wide variety of polyols may be employed as disclosed in the prior art, such as polyether polyols and polyester polyols. Illustrative suitable polyether polyols are polyoxypropylene diols having a molecular weight of between about 1,500 and 2,500, glycerol based polyoxypropylene triols having a molecular weight of between about 1,000 and 3,000, trimethylolpropane-based triols having a hydroxyl number of about 390, sorbitol-based hexol having a hydroxyl number of about 490, and sucrose-based octols having a hydroxyl number of about 410. Illustrative suitable polyester polyols are the reaction products of polyfunctional organic carboxylic acids such as succinic acid, adipic acid, phthalic acid and terephthalic acid with monomeric polyhydric alcohols such as glycerol, ethylene glycol, trimethylol propane, and the like. A wide variety of isocyanates may be employed as disclosed in the prior art. Illustrative suitable isocyanates are the aliphatic isocyanates such as hexamethylene diisocyanate, aromatic isocyanates such as toluene diisocyanate (TDI), preferably the isomeric mixture containing about 80 weight percent of the 2,4 isomer and 20 weight percent of the 2,6 isomer, crude TDI, crude diphenylmethane diisocyanate and polymethylpolyphenyl isocyanate.

The amount of blowing agent to be employed will depend on whether it is to be used as a primary or auxiliary blowing agent and the nature of the foams desired, i.e, whether flexible or rigid foam is desired.

The amount of blowing agent employed can be readily determined by persons of ordinary skill in the art. Generally, about 1 to about 15 weight percent based on the polyurethane forming reaction mixture is employed and preferably, about 5 to about 10 weight percent.

As is well known in the art, the urethane-forming reaction requires a catalyst. Any of the well known urethane-forming catalysts may be employed. Illustrative organic catalysts are the amino compounds such as triethylenediamine N,N,N',N'-tetramethylethylenediamine, dimethylethanolamine, triethylamine and N-ethylmorpholine. Inorganic compounds such as the non-basic heavy metal compounds as illustrated by dibutyl tin dilaurate, stannous octoate and manganese acetyl acetonate may also be used as catalysts. In general, the amount of catalyst present in the foam forming mixture ranges from about 0.05 to about 2 parts by weight per 100 parts by weight of the polyol component.

As is well recognized in the art, a variety of other additives may be incorporated in the foam-forming mixtures including stabilizers, such as silicone oils; cross-linking agents such as 1,4-butanediol, glycerol, triethanolamine methylenedianiline; plasticizers, such as tricresyl phosphate and dioctyl phthalate; antioxidants; flame retardants; coloring material; fillers; and antiscorch agents.

Polyurethane foams are prepared according to the invention by reacting and foaming a mixture of ingredients which will react to form the foams in the presence of a blowing agent according to the invention. In practice, the foam forming ingredients are blended, allowed to foam, and are then cured to a finished product. The foaming and curing reactions, and conditions therefor are well-known in the art and do not form a part of this invention. Such are more fully described in the prior art relating to the manufacture of polyurethane foams. Thus, for example, the polyether may first be converted to a polyetherpolyisocyanate prepolymer by reaction in one or more stages with an excess amount of isocyanate at temperatures from about 75°-125° C. or by reacting the polyol and the isocyanate together at room temperature in the presence of a catalyst for the reaction such as N-methylmorpholine. The prepolymer would then be charged to the foam-forming mixture as the foam producing ingredient with or without the addition of additional isocyanate and foamed in the presence of the blowing agent, optionally with additional polyol cross-linking agents and other conventional optional additives. Heat may be applied to cure the foam. If a prepolymer is not employed, the polyether, isocyanate, blowing agent and other optional additives may be reacted simultaneously to produce the foam in a single stage.

Aerosol products have employed individual halocarbons as well as haocarbon blends as propellant vapor pressure attenuators, in aerosol systems. Azeotropic mixtures, like those of the invention, with their constant compositions and vapor pressures would be very useful as solvents and propellants in aerosol systems.

The HCFC-253eb, cyclopentane, 2-methylpentane, 3-methylpentane, 2,2-dimethylbutane, 2,3-dimethylbutane, isohexane and n-hexane components of the invention are known materials. Preferably, they should be used in sufficiently high purity so as to avoid the introduction of adverse influences upon the solvent or constant boiling properties of the system.

Commercially available HCFC-253eb, cyclopentane, 2-methylpentane, 3-methylpentane, 2,2-dimethylbutane, 2,3-dimethylbutane, isohexane and n-hexane may be used in the present invention. The HCFC-253eb component may be purchased for example from PCR Inc., of Gainsville, Fla. or Halocarbon Products Co., of Hackensack, N.J. Alternately, it may be synthesized by reacting commercially available carbon tetrachloride and ethylene at low temperature in the presence of hydrogen fluoride as a catalyst to form 1,1,1,3-tetrachloropropane. The hydrogen fluoride then serves as a fluorination agent to convert the 1,1,1,3-tetrachloropropane to 1-chloro-3,3,3-trifluoropropane.

Inhibitors may be added to the present azeotrope-like compositions to inhibit decomposition of the compositions; react with undesirable decomposition products of the compositions; and/or prevent corrosion of metal surfaces. Any or all of the following classes of inhibitors may be employed in the invention: epoxy compounds such as propylene oxide; nitroalkanes such as nitromethane; ethers such as 1-4-dioxane; unsaturated compounds such as 1,4-butane diol; acetals or ketals such as dipropoxy methane; ketones such as methyl ethyl ketone; alcohols such as tertiary amyl alcohol; esters such as triphenyl phosphite; and amines such as triethyl amine. Other suitable inhibitors will readily occur to those skilled in the art.

Having described the invention in detail and by reference to preferred embodiments thereof, it will be apparent that modifications and variations are possible without departing from the scope of the invention defined in the appended claims.

The present invention is more fully illustrated by the following non-limiting Examples.

EXAMPLE 1

The compositional range over which HCFC-253eb and cyclopentane exhibit constant boiling behavior was determined. This was accomplished by charging measured quantities of HCFC-253eb into an ebulliometer. The ebulliometer consisted of a heated sump in which the HCFC-253fb was brought to a boil. The upper part of the ebulliometer connected to the sump was cooled thereby acting as a condenser for the boiling vapors, allowing the system to operate at total reflux. After bringing the HCFC-253fb to a boil at atmospheric pressure, measured amounts (3cc) of cyclopentane were titrated into the ebulliometer. The change in boiling point was measured with a platinum resistance thermometer.

The results indicate that compositions of HCFC-253eb and cyclopentane ranging from 52-85/48-15 weight percent respectively would exhibit constant boiling behavior at about 39.1° C.±0.5° C. at 760 mm Hg.

EXAMPLE 2

The compositional range over which HCFC-253eb and 2-methylpentane exhibit constant boiling behavior was determined by repeating the procedure outlined in Example 1 above. The results indicate that compositions of HCFC-253eb and 2-methylpentane ranging from 95-67/5-33 weight percent respectively would exhibit constant boiling behavior at about 43.2° C.±0.5° C. at 760 mm Hg.

EXAMPLE 3

The compositional range over which HCFC-253eb and 3-methylpentane exhibit constant boiling behavior was determined by repeating the procedure outlined in Example 1 above. The results indicate that compositions of HCFC-253eb and 3-methylpentane ranging from 70-97/30-3 weight percent respectively would exhibit constant boiling behavior at about 43.8° C.±0.5° C. at 760 mm Hg.

EXAMPLE 4

The compositional range over which HCFC-253eb and 2,2-dimethylbutane exhibit constant boiling behavior was determined by repeating the procedure outlined in Example 1 above. The results indicate that compositions of HCFC-253eb and 2,2-dimethylbutane ranging from 55-88/45-12 weight percent respectively would exhibit constant boiling behavior at about 40.1° C.±0.8° C. at 760 mm Hg.

EXAMPLE 5

The compositional range over which HCFC-253eb and 2,3-dimethylbutane exhibit constant boiling behavior was determined by repeating the procedure outlined in Example 1 above. The results indicate that compositions of HCFC-253eb and 2,3-dimethylbutane ranging from 65-94/35-6 weight percent respectively would exhibit constant boiling behavior at about 42.9° C.±0.8° C. at 760 mm Hg.

EXAMPLE 6

The compositional range over which HCFC-253eb and isohexane* exhibit constant boiling behavior was determined by repeating the procedure outlined in Example 1 above. The results indicate that compositions of HCFC-253eb and isohexane ranging from 55-92/45-8 weight percent respectively would exhibit constant boiling behavior at about 42.8° C.±0.5° C. at 760 mm Hg.

*The commercial isohexane used in Example 6 was purchased from Phillips 66 of Bartlettsville, Okla. It had the following composition: about 35 to about 75 weight percent 2-methylpentane, about 10 to about 40 weight percent 3-methylpentane, about 7 to about 30 weight percent 2,3-dimethylbutane, about 7 to about 30 weight percent 2,2-dimethylbutane, and about 0.1 to about 10 weight percent n-hexane.

EXAMPLE 7

The compositional range over which HCFC-253eb and n-hexane exhibit constant boiling behavior was determined by repeating the procedure outlined in Example 1 above. The results indicate that compositions of HCFC-253eb and n-hexane ranging from 85-97/15-3 weight percent respectively would exhibit constant boiling behavior at about 44.0° C.±0.5° C. at 760 mm Hg.

EXAMPLES 8-14

Performance studies are conducted to evaluate the solvent properties of the azeotrope-like compositions of the invention. Specifically, metal coupons are cleaned using the azeotrope-like composition of Example 1 as solvent (this experiment is repeated using the azeotrope-like compositions of Examples 2-7). The metal coupons are soiled with various types of oils and heated to 93° C. so as to partially simulate the temperature attained while machining and grinding in the presence of these oils.

The metal coupons thus treated are degreased in a simulated vapor phase degreaser. Condenser coils are kept around the lip of a cylindrical vessel to condense the solvent vapor which then collects in the vessel. The metal coupons are held in the solvent vapor and rinsed for a period of 15 seconds to 2 minutes depending upon the oils selected.

The cleaning performance of the azeotrope-like compositions is determined by visual observation and by measuring the weight change of the coupons using an analytical balance to determine the total residual materials left after cleaning. The results indicate that the compositions of the invention are effective solvents.

EXAMPLES 15-22

For the following examples, six-ounce three-piece aerosol cans are used. The azeotrope-like composition of each of Examples 1-7 is weighed into a tared aerosol can. After purging the can with tetrafluoroethane in order to displace the air within the container, a valve is mechanically crimped onto the can. Liquid chlorodifluoromethane is then added through the valve utilizing pressure burettes.

A printed circuit board having an area of 37.95 square inches and densely populated with dip sockets, resistors, and capacitors is precleaned by rinsing with isopropanol before wave soldering. The board is then fluxed and wave soldered using a Hollis TDL wave solder machine.

The printed circuit board is then spray cleaned using the aerosol can having the azeotrope-like composition therein. The cleanliness of the board is tested visually and also using an Omega-meter which measures the ionic contamination of the board. The results indicate that the azeotrope-like compositions of the invention are effective cleaning agents.

EXAMPLES 23-29

Free-rise rigid polyurethane foam is prepared from the formulation specified in Table V using a Martin Sweets Co. Modern Module III urethane foam machine at a delivery rate of 15 lbs./min. and by using the azeotrope-like composition of Example 1 as blowing agent (This experiment is repeated using the compositions of Examples 2-7). This polyurethane formulation is one example of a pour-in-place rigid polyurethane formulation which might be used as appliance insulation.

TABLE V

RIGID POLYURETHANE FORMULATION

| Component | Parts by weight |
|---|---|
| Pluracol 1114[1] (420-OH#) | 100.0 |
| Silicone L-5340[2] | 1.5 |
| Thancat TD-33[3] | 0.5 |
| Thancat DME[4] | 0.2 |
| Catalyst T-12[5] | 0.1 |
| HCFC-253eb/$C_5$ or $C_6$ hydrocarbon(80/20) | 30.0 |
| Lupranate M20S[6] (1.29 Index) | 129.0 |

[1]BASF Wyandotte Corp. - polyether polyol
[2]Union Carbide Corp. - silicone surfactant
[3]Texaco Inc. - 33% triethylene diamine in propylene glycol
[4]Texaco Inc. - N,N-dimethylethanolamine
[5]Metal & Thermit Co. - dibutyl dilaurate
[6]BASF Wyandotte Corp. - polymethylene polyphenylisocyanate

What is claimed is:

1. Azeotrope-like compositions consisting essentially of from about 85 to about 52 weight percent 1-chloro-3,3,3-trifluoropropane and from about 15 to about 48 weight percent cyclopentane which boil at about 39.1° C. at 760 mm Hg; or from about 95 to about 67 weight percent 1-chloro-3,3,3-trifluoropropane and from about 5 to about 33 weight percent 2-methylpentane which boil at about 43.2° C. at 760 mm Hg; or from about 97 to about 70 weight percent 1-chloro-3,3,3-trifluoropropane and from about 3 to about 30 weight percent 3-methylpentane which boil at about 43.8° C. at 760 mm Hg; or from about 88 to about 55 weight percent 1-chloro-3,3,3-trifluoropropane and from about 12 to about 45 weight percent 2,2-dimethylbutane which boil at about 40.1° C. at 760 mm Hg; or from about 94 to about 65 weight percent 1-chloro-3,3,3-trifluoropropane and from about 6 to about 35 weight percent 2,3-dimethylbutane which boil at about 42.9° C. at 760 mm Hg; or from about 92 to about 55 weight percent 1-chloro-3,3,3-trifluoropropane and from about 8 to about 45 weight percent of a mixture consisting of from about 35 to about 75 weight percent 2-methylpentane, about 10 to about 40 weight percent 3-methylpentane, about 7 to about 30 weight percent 2,3-dimethylbutane, about 7 to about 30 weight percent 2,2-dimethylbutane, and about 0.1 to about 10 weight percent n-hexane which boil at about 42.8° C. at 760 mm Hg; or from about 97 to about 85 weight percent 1-chloro-3,3,3-trifluoropropane and from about 3 to about 15 weight percent n-hexane which boil at about 44.0° C. at 760 mm Hg; wherein the azeotrope-like components of the composition consist of 1-chloro-3,3,3-trifluoropropane and either cylopentane, 2-methylpentane, 3-methylpentane, 2,2-dimethylbutane, 2,3-dimethylbutane, said mixture of 2-methylpentane, 3-methylpentane, 2,3-dimethylbutane, 2,2-dimethylbutane, and n-hexane.

2. The azeotrope-like compositions of claim 1 wherein said compositions of 1-chloro-3,3,3-trifluoropropane and cyclopentane boil at 39.1° C.±about 0.5° C. at 760 mm Hg.

3. The azeotrope-like compositions of claim 1 wherein said compositions consist essentially of from about 82.5 to about 60 weight percent 1-chloro-3,3,3-trifluoropropane and from about 17.5 to about 40 weight percent cyclopentane.

4. The azeotrope-like compositions of claim 3 wherein said compositions consist essentially of from about 77.5 to about 62 weight percent 1-chloro-3,3,3-trifluoropropane and from about 22.5 to about 38 weight percent cyclopentane.

5. The azeotrope-like compositions of claim 1 wherein said compositions of 1-chloro-3,3,3-trifluoropropane and 2-methylpentane boil at 43.2° C.±about 0.5° C. at 760 mm Hg.

6. The azeotrope-like compositions of claim wherein said compositions consist essentially of from about 92 to about 70 weight percent 1-chloro-3,3,3-trifluoropropane and from about 8 to about 30 weight percent 2-methylpentane.

7. The azeotrope-like compositions of claim 6 wherein said compositions consist essentially of from about 89 to about 75 weight percent 1-chloro-3,3,3-trifluoropropane and from about 11 to about 25 weight percent 2-methylpentane.

8. The azeotrope-like compositions of claim 1 wherein said compositions of 1-chloro-3,3,3-trifluoropropane and 3-methylpentane boil at 43.8° C.±about 0.5° C. at 760 mm Hg.

9. The azeotrope-like compositions of claim 1 wherein said compositions consist essentially of from about 95 to about 73 weight percent 1-chloro-3,3,3-trifluoropropane and from about 5 to about 27 weight percent 3-methylpentane.

10. The azeotrope-like compositions of claim 9 wherein said compositions consist essentially of from about 93 to about 73 weight percent 1-chloro-3,3,3-trifluoropropane and from about 7 to about 27 weight percent 3-methylpentane.

11. The azeotrope-like compositions of claim 1 wherein said compositions of 1-chloro-3,3,3-trifluoropropane and 2,2-dimethylbutane boil at 40.1° C.±about 0.8° C. at 760 mm Hg.

12. The azeotrope-like compositions of claim 1 wherein said compositions consist essentially of from about 85 to about 60 weight percent 1-chloro-3,3,3-trifluoropropane and from about 15 to about 40 weight percent 2,2-dimethylbutane.

13. The azeotrope-like compositions of claim 12 wherein said compositions consist essentially of from about 82 to about 62 weight percent 1-chloro-3,3,3-trifluoropropane and from about 18 to about 38 weight percent 2,2-dimethylbutane.

14. The azeotrope-like compositions of claim 1 wherein said compositions of 1-chloro-3,3,3-trifluoropropane and 2,3-dimethylbutane boil at 42.9° C.±about 0.8° C. at 760 mm Hg.

15. The azeotrope-like compositions of claim 1 wherein said compositions consist essentially of from about 93 to about 67 weight percent 1-chloro-3,3,3-trifluoropropane and from about 7 to about 33 weight percent 2,3-dimethylbutane.

16. The azeotrope-like compositions of claim 15 wherein said compositions consist essentially of from about 92 to about 67 weight percent 1-chloro-3,3,3-trifluoropropane and from about 8 to about 33 weight percent 2,3-dimethylbutane.

17. The azeotrope-like compositions of claim 1 wherein said compositions of 1-chloro-3,3,3-trifluoropropane and said mixture consisting of from about 35 to about 75 weight percent 2-methylpentane, about 10 to about 40 weight percent 3-methylpentane, about 7 to about 30 weight percent 2,3-dimethylbutane, about 7 to about 30 weight percent 2,2-dimethylbutane, and about 0.1 to about 10 weight percent n-hexane boil at 42.8° C.±about 0.5° C. at 760 mm Hg.

18. The azeotrope-like compositions of claim 1 wherein said compositions consist essentially of from about 91 to about 60 Weight percent 1-chloro-3,3,3-trifluoropropane and from about 9 to about 40 weight percent of said mixture consisting of from about 35 to about 75 weight percent 2-methylpentane, about 10 to about 40 weight percent 3-methylpentane, about 7 to about 30 weight percent 2,3-dimethylbutane, about 7 to about 30 weight percent 2,2-dimethylbutane, and about 0.1 to about 10 weight percent n-hexane.

19. The azeotrope-like compositions of claim 18 wherein said compositions consist essentially of from about 90 to about 62 weight percent 1-chloro-3,3,3-trifluoropropane and from about 10 to about 38 weight percent of said mixture consisting of from about 35 to about 75 weight percent 2-methylpentane, about 10 to about 40 weight percent 3-methylpentane, about 7 to about 30 weight percent 2,3-dimethylbutane, about 7 to about 30 weight percent 2,2-dimethylbutane, and about 0.1 to about 10 weight percent n-hexane.

20. The azeotrope-like compositions of claim 1 wherein said compositions of 1-chloro-3,3,3-trifluoropropane and n-hexane boil at 44.0° C.±about 0.5° C. at 760 mm Hg.

21. The azeotrope-like compositions of claim 1 wherein said compositions consist essentially of from about 96 to about 88 weight percent 1-chloro-3,3,3-trifluoropropane and from about 4 to about 12 weight percent n-hexane.

22. The azeotrope-like compositions of claim 21 wherein said compositions consist essentially of from about 95 to about 90 weight percent 1-chloro-3,3,3-trifluoropropane and from about 5 to about 10 weight percent n-hexane.

23. The azeotrope-like compositions of claim 1 wherein an effective amount of an inhibitor is present in said compositions to accomplish at least one of the following functions: to inhibit decomposition of the compositions; react with undesirable decomposition products of the compositions; and prevent corrosion of metal surfaces.

24. The azeotrope-like compositions of claim 23 wherein said inhibitor is selected from the group consisting of epoxy compounds, nitroalkane, acetals, ketals, ketones, alcohols, esters and amines.

25. A method of cleaning a solid surface comprising treating said surface with an azeotrope-like composition of claim 1.

26. A process for preparing a polyurethane or polyisocyanurate foam comprising reacting and foaming a mixture of ingredients which will react to form the polyurethane or polyisocyanurate foam in the presence of at least one blowing agent according to claim 1.

27. An aerosol composition comprising a propellant and an active agent, wherein the propellant is an azeotrope-like composition of claim 1.

* * * * *